US012732620B2

(12) United States Patent
Khojastepour et al.

(10) Patent No.: US 12,732,620 B2
(45) Date of Patent: Sep. 8, 2026

(54) DEEP LEARNING-BASED QUALITY CONTROL OF VIDEO COMPRESSION

(71) Applicant: NEC Laboratories America, Inc., Princeton, NJ (US)

(72) Inventors: Mohammad Khojastepour, Lawrenceville, NJ (US); Srimat Chakradhar, Manalapan, NJ (US); Matin Mortaheb, College Park, MD (US)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 18/941,015

(22) Filed: Nov. 8, 2024

(65) Prior Publication Data

US 2025/0159192 A1 May 15, 2025

Related U.S. Application Data

(60) Provisional application No. 63/597,815, filed on Nov. 10, 2023.

(51) Int. Cl.

*H04N 19/147* (2014.01)
*G06V 10/82* (2022.01)
*G06V 20/40* (2022.01)
*H04N 19/126* (2014.01)
*H04N 19/172* (2014.01)

(52) U.S. Cl.

CPC ........... *H04N 19/147* (2014.11); *G06V 10/82* (2022.01); *G06V 20/41* (2022.01); *H04N 19/126* (2014.11); *H04N 19/172* (2014.11)

(58) Field of Classification Search

CPC .. H04N 19/147; H04N 19/126; H04N 19/172; H04N 19/124; G06V 10/82; G06V 20/41

See application file for complete search history.

(56) References Cited

U.S. PATENT DOCUMENTS

2017/0264902 A1* 9/2017 Ye ........................ H04N 19/124
2022/0086466 A1* 3/2022 Holland ............... H04N 19/196
2022/0094928 A1* 3/2022 Amirpour ............ H04N 19/119
2024/0275996 A1* 8/2024 Debnath .............. H04N 19/119

OTHER PUBLICATIONS

Hendrycks, D., & Gimpel, K. (Jun. 27, 2016). Gaussian error linear units (gelus). arXiv preprint arXiv:1606.08415.

(Continued)

*Primary Examiner* — Howard D Brown, Jr.
*Assistant Examiner* — Tyler B Edwards
(74) *Attorney, Agent, or Firm* — Vincent Duffy

(57) ABSTRACT

Systems and methods for a deep learning-based quality control for video compression. Video quality of a streaming media can be updated using an optimized quantization parameters (QP). Optimized QP can be predicted from the video chunks and their respective QP that conforms to a peak signal-to-noise ratio (PSNR) threshold while minimizing an encoded video bitrate of the compressed video by utilizing a trained video quality control unit. Video chunks can be encoded with respective QP. Video chunks can be partitioned from video data obtained from the streaming media.

20 Claims, 6 Drawing Sheets

(56) References Cited

OTHER PUBLICATIONS

Wiegand, T., Sullivan, G. J., Bjontegaard, G., & Luthra, A. (Jul. 2003). Overview of the H. 264/AVC video coding standard. IEEE Transactions on circuits and systems for video technology, 13(7), 560-576.
Feichtenhofer, C. (Jun. 16, 2020). X3d: Expanding architectures for efficient video recognition. In Proceedings of the IEEE/CVF conference on computer vision and pattern recognition (pp. 203-213).
Apple HTTP Live Streaming. Accessed: Sep. 25, 2014. [Online]. Available: https://developer.apple.com/resources/http-streaming/.
Stockhammer, T. (Feb. 23, 2011). Dynamic adaptive streaming over HTTP—standards and design principles. In Proceedings of the second annual ACM conference on Multimedia systems (pp. 133-144).
Wu, Y., & He, K. (Sep. 8, 2018). Group normalization. In Proceedings of the European conference on computer vision (ECCV) (pp. 3-19).

* cited by examiner

DEEP LEARNING-BASED QUALITY CONTROL OF VIDEO COMPRESSION

RELATED APPLICATION INFORMATION

This application claims priority to U.S. Provisional App. No. 63/597,815, filed on Nov. 10, 2023, incorporated herein by reference in its entirety.

BACKGROUND

Technical Field

The present invention relates to video compression for streaming media formats and more particularly to a deep-learning-based quality control of video compression.

Description of the Related Art

The landscape of digital communication has been profoundly reshaped by the evolution of live streaming and video transmission. This transformation has altered how we connect, communicate, and consume content. Thanks to high-speed internet and advanced technology, individuals and organizations can now effortlessly share real-time experiences, events, and information with a global audience through live streaming. However, a balance between video quality and the necessary bandwidth is important for user satisfaction. In certain situations, video quality requirements vary based on the service tier, while in others, these requirements change over time due to user demand. Consequently, the pursuit of video transmission technologies that can deliver seamless live streams with minimal latency and the desired quality has become increasingly important.

SUMMARY

According to an aspect of the present invention, a computer-implemented method is provided for real-time quality control of video compression for streaming media, including, partitioning video data from the streaming media into video chunks, encoding the video chunks with respective quantization parameters (QP), predicting an optimized QP from the video chunks and their respective QP that conforms to a peak signal-to-noise ratio (PSNR) threshold while minimizing an encoded video bitrate of the compressed video by utilizing a trained video quality control unit (VQCU), and updating the video quality of a streaming media with the optimized QP.

According to another aspect of the present invention, a system for real-time quality control of video compression for streaming media is provided, including a memory device, one or more processor devices operatively coupled with the memory device to partition video data from the streaming media into video chunks, encode the video chunks with respective quantization parameters (QP), predict an optimized QP from the video chunks and their respective QP that conforms to a peak signal-to-noise ratio (PSNR) threshold while minimizing an encoded video bitrate of the compressed video by utilizing a trained video quality control unit (VQCU), and update the video quality of a streaming media with the optimized QP.

According to yet another aspect of the present invention, a non-transitory computer program product is provided including a computer-readable storage medium having program code for deep learning-based quality control for video compression, wherein the program code when executed on a computer causes the computer to partition video data from the streaming media into video chunks, encode the video chunks with respective quantization parameters (QP), predict an optimized QP from the video chunks and their respective QP that conforms to a peak signal-to-noise ratio (PSNR) threshold while minimizing an encoded video bitrate of the compressed video by utilizing a trained video quality control unit (VQCU), and update the video quality of a streaming media with the optimized QP.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
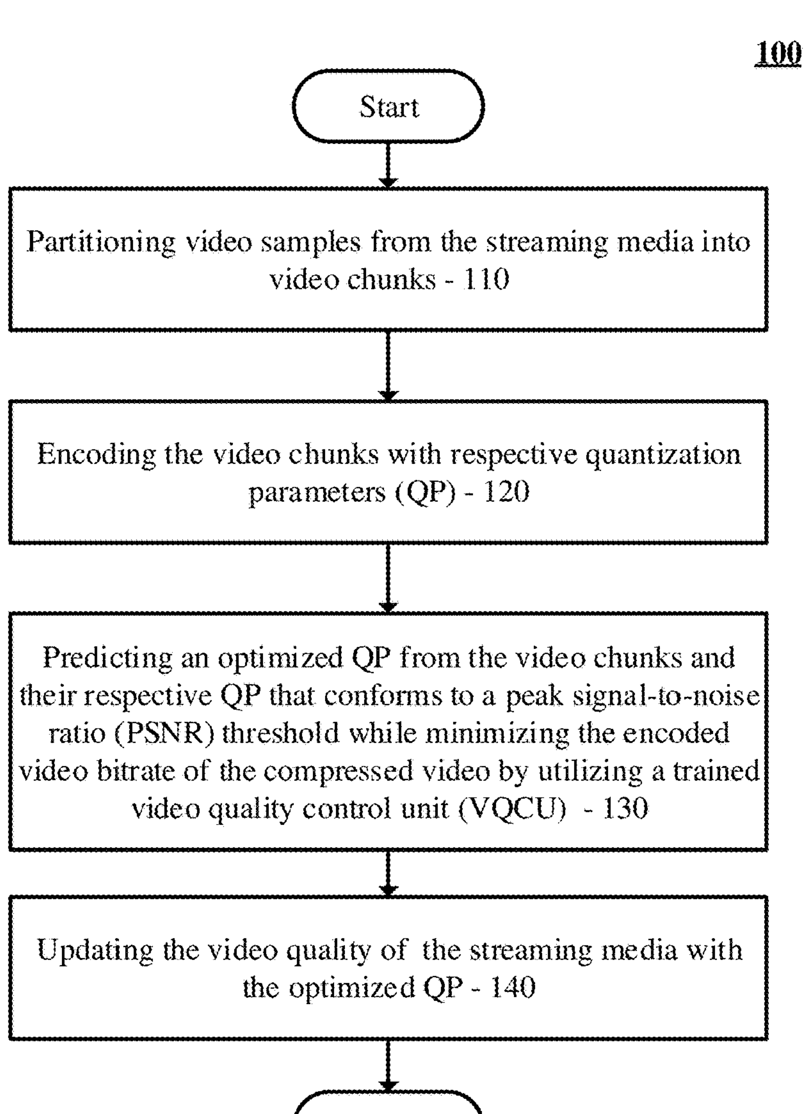
FIG. 1 is a flow diagram illustrating a high-level overview of a computer implemented method for a deep learning-based quality control for video compression is illustratively depicted in accordance with one embodiment of the present invention.

In accordance with embodiments of the present invention, systems and methods are provided for a deep learning-based quality control for video compression.

In an embodiment, video quality of a streaming media can be updated using an optimized quantization parameters (QP). Optimized QP can be predicted from the video chunks and their respective QP that conforms to a peak signal-to-noise ratio (PSNR) threshold while minimizing an encoded video bitrate of the compressed video by utilizing a trained video quality control unit. Video chunks can be encoded with respective QP. Video chunks can be partitioned from video data obtained from the streaming media.

Ensuring high-quality video content for wireless users has become increasingly vital. Nevertheless, maintaining a consistent level of video quality is difficult due to the fluctuating encoded bitrate caused by dynamic video content especially in live streaming scenarios. Video compression is typically employed to eliminate unnecessary redundancies within and between video frames, thereby reducing the required bandwidth for video transmission.

The encoded bitrate and quality of the compressed video depend on encoder parameters, specifically the Quantization Parameter (QP). Poor choices of encoder parameters can result in reduced bandwidth efficiency and high likelihood of non-conformance. Non-conformance refers to the violation of the Peak Signal-to-Noise Ratio (PSNR) constraint for an encoded video segment.

To address these issues, the present embodiments present a deep learning-based quality control unit for video compression. The deep learning-based quality control unit for video compression can dynamically estimate the optimal encoder parameters based on the video content of a video chunk with minimal delay.

The present embodiments can achieve improvements of up to 2.5 times in average bandwidth usage compared to state-of-the-art adaptive bitrate video streaming, with a negligible non-conformance probability below 0.1%.

The present embodiments improve streaming media compression systems by having a better understanding of the complexity of the video streams and scene by forecasting the compression bitrate and PSNR for a video chunk for streaming media.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level overview of a computer implemented method for a deep learning-based quality control for video compression is illustratively depicted in accordance with one embodiment of the present invention.

In an embodiment, video quality of a streaming media can be updated using an optimized quantization parameters (QP). Optimized QP can be predicted from the video chunks and their respective QP that conforms to a peak signal-to-noise ratio (PSNR) threshold while minimizing an encoded video bitrate of the compressed video by utilizing a trained video quality control unit. Video chunks can be encoded with respective QP. Video chunks can be partitioned from video data obtained from the streaming media.

Referring now to block 110 of FIG. 1 showing a method of partitioning video data from the streaming media into video chunks, in accordance with an embodiment of the present invention.

The video data from the streaming media can be continuously partitioned into video chunks by a video encoder tool such as FFmpeg. The video chunks can include a series of consecutive video frames. A video chunk can contain one or more group of pictures (GOP) defined as a group of video frames over which the temporal encoding/decoding process can happen. In an embodiment, the video chunk size can be one Group of Pictures (GOP) with a size (T) of predefined number of frames such as eight frames. For videos with a frame rate per second (fps) of twenty-five, the resulting video chunk size and frame size of eight frames, can be 0.32 seconds.

A fixed number of video fps can be obtained during the video capture and encoding process. Each video frame maintains a constant width (W) and height (H). With minimal delay in the video encoder (VE), the video buffer preceding and following the VE exclusively contains active video frames, facilitating temporal encoding/decoding processes. The encoding and decoding standard can include H.264, H.265, MP4, etc. Other standards can be used.

Referring now to block 120 of FIG. 1 showing a method of encoding the video chunks with respective quantization parameters (QP), in accordance with an embodiment of the present invention.

Quantization parameters can determine the quantization step size applied to transform coefficients within video frames. Quantization lowers the precision of coefficients within video frames which leads to video compression. The lower the QP, the higher the quality of video after compression.

The encoded video V" for a chunk V is generated by VE with particular H, W, and fps. Both the PSNR p (V, QP) and the bitrate of V", e.g., the encoded bitrate b (V, QP), is a function of quantization parameter QP using a video standard codec. The video encoder can be a video encoder/decoder tool such as FFmpeg.

The encoded video can be encapsulated into container packets which are sent through the network. The network can implement a cloud computing environment and other network implementations. The encoded video can be decoded after reception of the container packets through the error control behavior of the physical layer of a streaming media device.

Referring now to block 130 of FIG. 1 showing a method of predicting an optimized QP from the video chunks and their respective QP that that conforms to a peak signal-to-noise ratio (PSNR) threshold while minimizing the encoded video bitrate of the compressed video by utilizing a trained video quality control unit, in accordance with an embodiment of the present invention.

The peak signal to noise ratio (PSNR) can refer to the quality of the representation of a video after compression in terms of noise detected in the video signal. The bitrate of a video can refer to how many bits of video data can be transferred or processed within a certain amount of time. In streaming media, a high bitrate can result in video loss which can be perceived by users as frozen, choppy images while streaming a video. Thus, balancing PSNR and bitrate of video is ideal for video streaming. To achieve a desired PSNR value, QP values for each video chunk can be dynamically adjusted before encoding.

The PSNR and the bitrate are functions of the video content, e.g., the scene complexity and dynamics of the video frames. However, even though the value of QP can be changed to increase or decrease the PSNR or the bitrate, the same value of QP can produce different video quality or bitrate depending on the video content.

The real-time nature of live streaming complicates the control of the QP to satisfy PSNR and minimize bitrate. This scenario is exemplified in FIG. 2.

Figure 2:
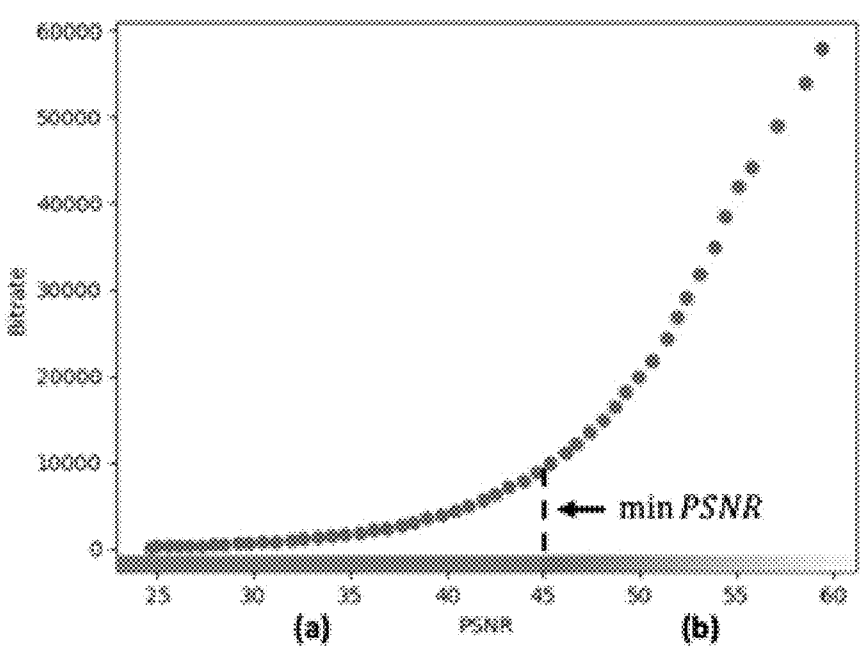
FIG. 2 is a graph illustrating video quality measured in terms of bitrate and PSNR.

Referring now to FIG. 2, showing a graph of video quality measured in terms of bitrate and PSNR.

The x-axis represents the PSNR, the y-axis represents the corresponding bitrate. It is observed that the higher the requirement on the PSNR, the higher the bitrate required to satisfy the requirement. In the same figure and just above the PSNR axis, the graph illustrates two regions for encoded video quality with respect to a minimum constraint on PSNR. The region (a) in the left is not ideal since the PSNR is not sufficient, which can result to non-conforming encoded video chunks. The region (b) in the right marked with gradient-filled green is where the PSNR is satisfied, but in order to minimize the bitrate, the encoder has to operate as close to the PSNR threshold as possible without crossing the PSNR threshold.

If the encoder selects a QP value that is too low, the resulting encoded video quality can be high and the threshold on the encoded video quality (PSNR) can be easily satisfied. However, a low value of QP can lead to unnecessary high bitrate and an inefficient utilization of the available bandwidth. Conversely, if the selected QP is too high, the encoded video quality (PSNR) falls short of the desired PSNR threshold (e.g., p (V, QP)>>λ(t)), that results in non-conforming video chunks with respect to the system PSNR threshold λ(t) at time t. To balance the PSNR and the encoding bitrate, the present embodiments employ a video quality control unit.

Figure 3:
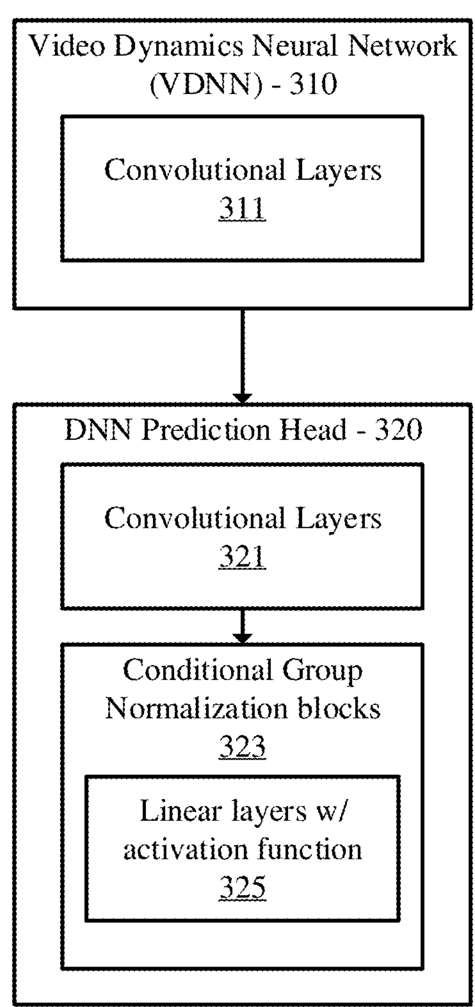
FIG. 3 is a block diagram of a system for a video quality control unit employed to predict an appropriate encoded video quality, in accordance with an embodiment of the present invention.

The architecture of the video quality control unit is described in more detail in FIG. 3.

Referring now to FIG. 3, showing a block diagram of a system for a video quality control unit employed to predict an appropriate encoded video quality, in accordance with an embodiment of the present invention.

The video quality control unit (VQCU) 300 can include a video dynamics neural network (VDNN) 310 and a deep neural network (DNN) prediction head.

The VDNN 310 can incorporate a diverse set of convolutional layers 311 that can enhance its ability to recognize and comprehend video content including scene complexity and video dynamics. To process video content with dimensions [B, 3, T, W, H], VDNN 310 produces corresponding feature vectors sized as [B, 196, T, W/16, H/16], where B represents the batch size, T denotes the number of frames in a segment, W width of the video segment, and H height of the video segment.

The resulting feature of the VDNN 310 is further processed through a Deep Neural Network (DNN) prediction head 320. The DNN prediction head 320 can include multiple convolutional layers 321, each followed by a Conditional Group Normalization (CGN) blocks 323. The CGN blocks 323 can normalize the output from the preceding convolutional layers. Notably, the CGN block takes a tensor of log 10 (λ(t)) with a size of [B, 1] as a conditioning factor. Each element in this tensor can represent the required minimum PSNR for each video sample within the batch.

The CGN blocks 323 can process the conditioning factor through three linear layers, each incorporating an activation function, thereby transforming the tensor size to [2B, 1]. Subsequently, this tensor is split into two tensors of size [B, 1], denoted as γ and β. These tensors are then utilized to adjust the normalized output from the preceding layer using the formula γ output+β. This approach effectively trains the video feature to discern QP values across various scenarios with varying magnitudes of λ(t).

Referring now to a method of training the VQCU 300.

To facilitate the training of the VQCU 300, a dataset that includes uncompressed color encoding formatted videos (e.g., brightness and color (YUV)) can be employed. This dataset encompasses multiple types of videos, all in a standard video format (e.g., quarter common intermediate format (QCIF)). These videos can be partitioned into uniform video chunks of consecutive frames of predefined number (e.g., eight) by employing a process facilitated by the video encoding/decoding tool described herein such as FFmpeg tool.

The training dataset can include a tuple of a video chunk (V), a specified target quantization parameter (QPtarget), and the corresponding minimum PSNR (λtarget) linked to the designated QPtarget.

During the training, the VQCU 300 can take an input pair comprising a video chunk (from the training-set) and its corresponding encoded PSNR and the output of the VQCU is compared against the input label comprising the corresponding QP value for the selected training video chunk.

The VQCU 300 can utilize the video chunks as input and the minimum PSNR value as a conditioning factor for the Conditional Group Normalization (CGN) blocks. The output of the VQCU 300 includes the optimized QP. The optimized QP can be employed to calculate a corresponding encoded video bitrate and the PSNR.

During training, the VQCU computes an estimated QP ($\widetilde{QP}$) as based on the video chunks as input and the minimum PSNR value as a conditioning factor for the Conditional Group Normalization (CGN) blocks. The minimum PSNR value can be computed based on the video quality selected for the streaming media based on the mean squared error of an image and its noisy approximation, and the maximum possible pixel value of an image from the video chunks.

To train the VQCU, the following loss function can be used: L=LCE ($\widetilde{QP}$, $QP_{target}$), where LCE is cross-entropy loss, $\widetilde{QP}$ is the estimated QP, and $QP_{target}$ is the target QP.

In another embodiment, a lower value than the estimated QP can be used for the loss function. By doing so, the packet success rate of VQCU 300 to adhere to the minimum PSNR can be improved.

Referring back now to block 140 of FIG. 1 showing a method of updating a video quality of a compressed video for the streaming media with the encoded video bitrates, in accordance with an embodiment of the present invention.

The present embodiments can update the video quality of streaming media based on the encoded video generated from the streaming video data using the optimized QP predicted by the VQCU 300. This is shown in more detail in FIG. 4.

Figure 4:
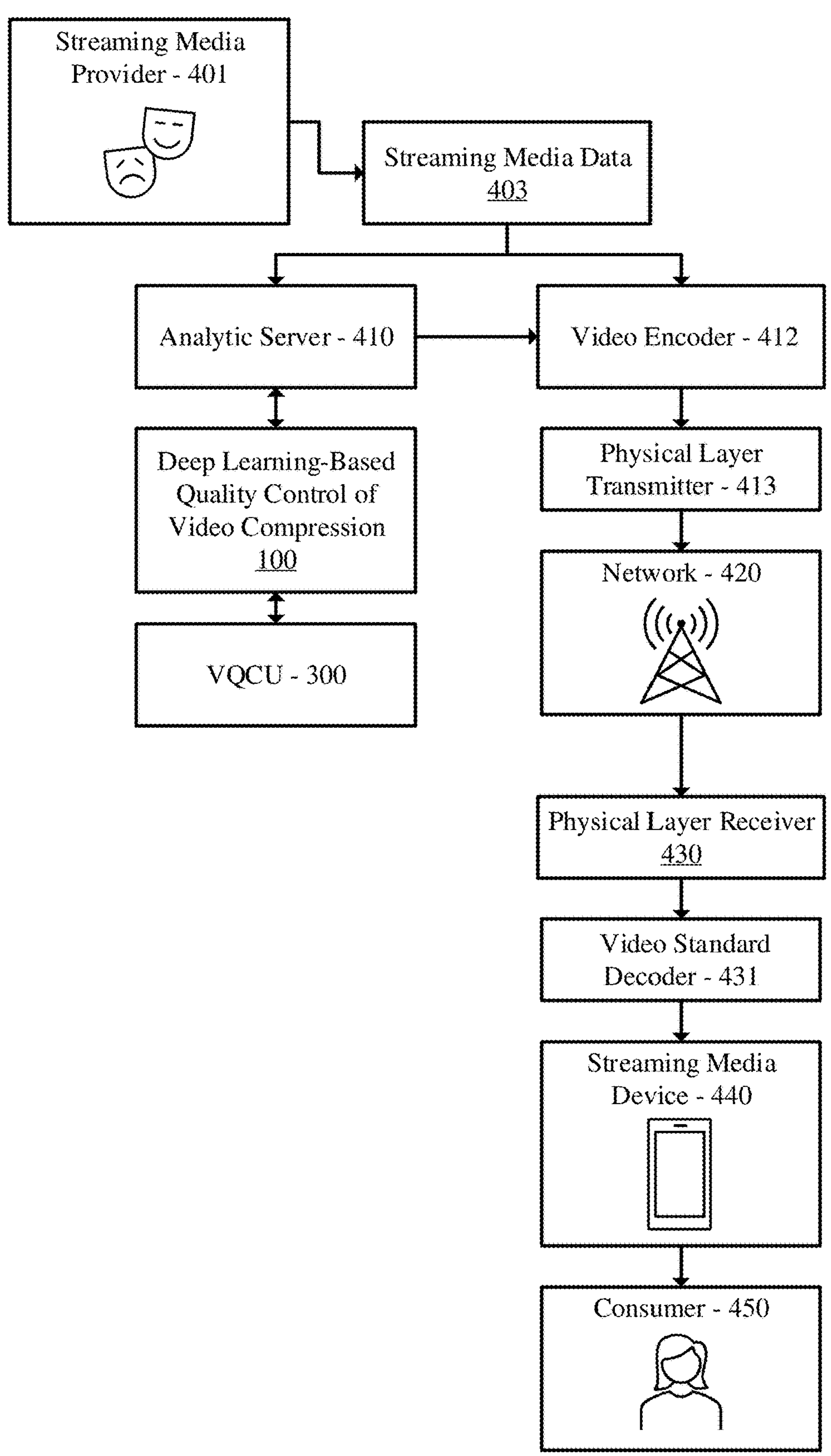
FIG. 4 is a block diagram of a system implementing a practical application of the deep learning-based quality control of video compression, in accordance with an embodiment of the present invention.

Referring now to FIG. 4 showing a block diagram of a system implementing a practical application of the deep learning-based quality control of video compression, in accordance with an embodiment of the present invention.

The system 400 can collect streaming media data 403 from streaming media providers 401. The streaming media data 403 can be video, audio, or any media format that can be streamed. The streaming media data 403 can be sent to an analytic server 410 which can implement the deep learning-based quality control of video compression 100 and the VQCU 300 which performs the video compression optimization process described herein.

The analytic server 410 can provide the optimized QP to a video encoder 412 to encode the streaming media data 403, which can be sent to the physical layer transmitter 413 to send the streaming media data 403 over to a network 420 that is connected to a streaming media device 440 for the consumer 450. The encoded streaming media data 403 can then be received by the physical layer receiver 430 of the streaming media device 440, which can then be decoded by the video standard decoder 431 of the streaming media device 440. The streaming media device 440 can the provide the optimized streaming media data to the consumer 450.

The present embodiments can be utilized for other streaming media formats such as audio, images, etc.

Thus, as described herein, the present embodiments improve streaming media compression systems by having a better understanding of the complexity of the video streams and scene by forecasting the compression bitrate and PSNR for a video chunk for streaming media.

Figure 5:
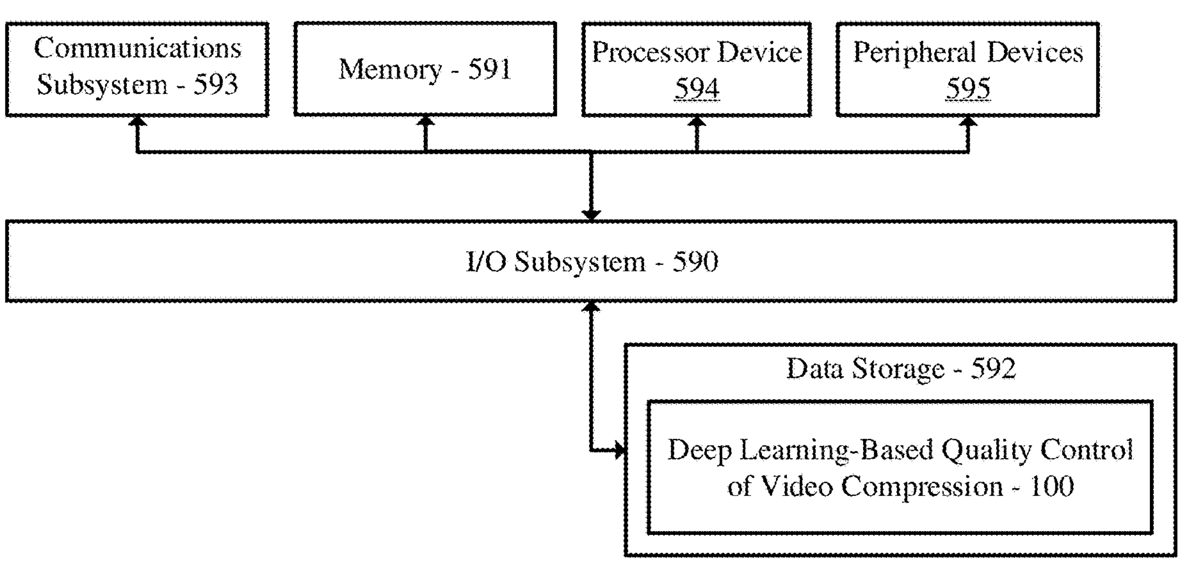
FIG. 5 is a block diagram of a computing device that implements the deep learning-based quality control of video compression, in accordance with an embodiment of the present invention.

Referring now to FIG. 5, showing a block diagram of a computing device that implements the deep learning-based quality control of video compression, in accordance with an embodiment of the present invention.

The computing device 500 illustratively includes the processor device 594, an input/output (I/O) subsystem 590, a memory 591, a data storage device 592, and a communication subsystem 593, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 591, or portions thereof, may be incorporated in the processor device 594 in some embodiments.

The processor device 594 may be embodied as any type of processor capable of performing the functions described herein. The processor device 594 may be embodied as a single processor, multiple processors, a Central Processing Unit(s) (CPU(s)), a Graphics Processing Unit(s) (GPU(s)), a single or multi-core processor(s), a digital signal processor (s), a microcontroller(s), or other processor(s) or processing/controlling circuit(s).

The memory 591 may be embodied as any type of volatile or non-volatile memory or data storage capable of performing the functions described herein. In operation, the memory 591 may store various data and software employed during operation of the computing device 500, such as operating systems, applications, programs, libraries, and drivers. The memory 591 is communicatively coupled to the processor device 594 via the I/O subsystem 590, which may be embodied as circuitry and/or components to facilitate input/output operations with the processor device 594, the memory 591, and other components of the computing device 500. For example, the I/O subsystem 590 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 590 may form a portion of a system-on-a-chip (SOC) and be incorporated, along with the processor device 594, the memory 591, and other components of the computing device 500, on a single integrated circuit chip.

The data storage device 592 may be embodied as any type of device or devices configured for short-term or long-term storage of data such as, for example, memory devices and circuits, memory cards, hard disk drives, solid state drives, or other data storage devices. The data storage device 592 can store program code for the deep learning-based quality control for video compression 100. Any or all of these program code blocks may be included in a given computing system.

The communication subsystem 593 of the computing device 500 may be embodied as any network interface controller or other communication circuit, device, or collection thereof, capable of enabling communications between the computing device 500 and other remote devices over a network. The communication subsystem 593 may be configured to employ any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 595. The peripheral devices 595 may include any number of additional input/output devices, interface devices, and/or other peripheral devices. For example, in some embodiments, the peripheral devices 595 may include a display, touch screen, graphics circuitry, keyboard, mouse, speaker system, microphone, network interface, and/or other input/output devices, interface devices, GPS, camera, and/or other peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be employed. Moreover, additional processors, controllers, memories, and so forth, in various configurations can also be utilized. These and other variations of the computing system 500 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
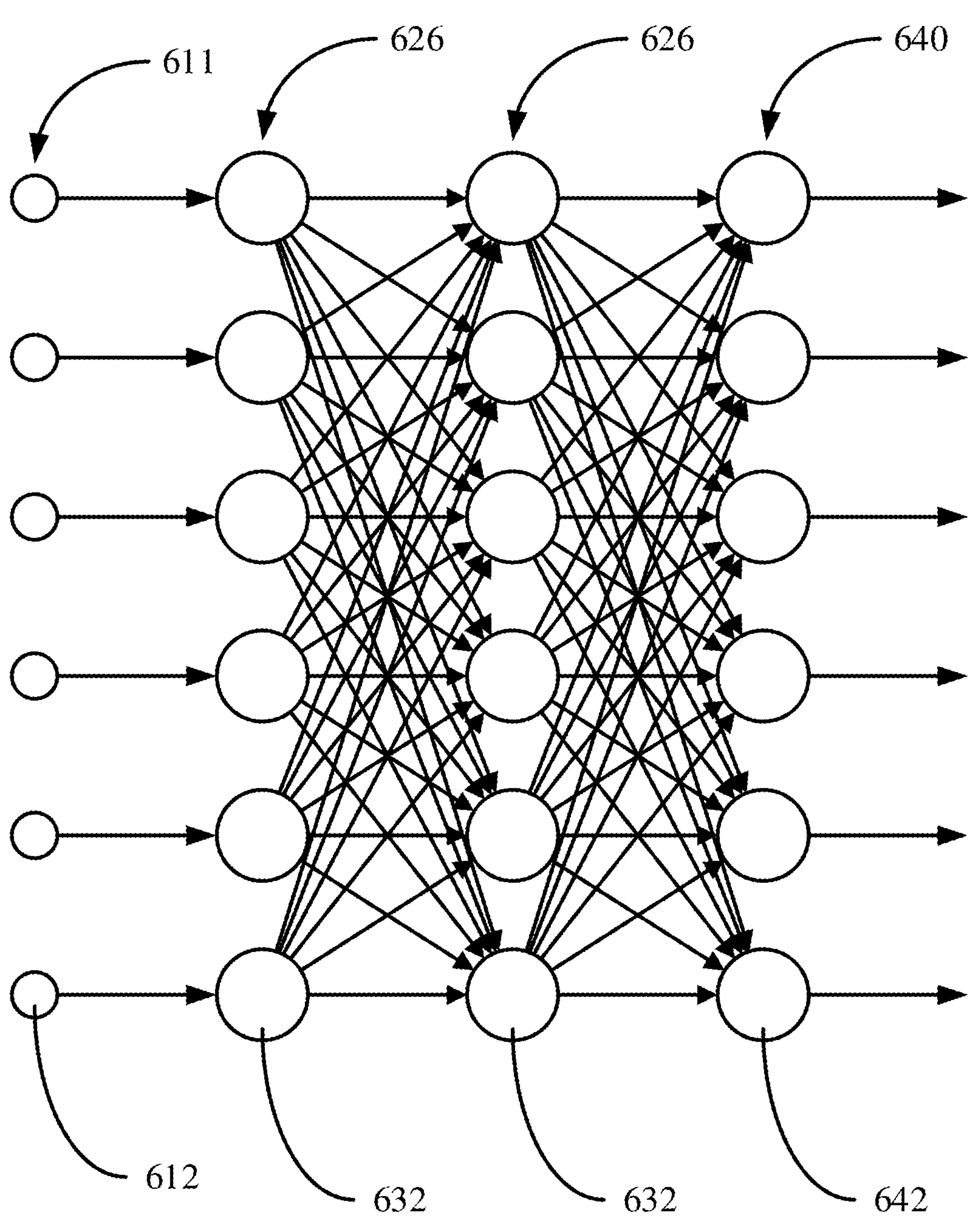
FIG. 6 is a block diagram illustrating deep learning neural networks for the deep learning-based quality control for video compression, in accordance with an embodiment of the present invention.

Referring now to FIG. 6, a block diagram illustrating deep learning neural networks for the deep learning-based quality control for video compression, in accordance with an embodiment of the present invention.

A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and γ represents the known output. The input data may include a variety of different data types and may include multiple distinct values. The network can have one input neurons for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

The deep neural network 600, such as a multilayer perceptron, can have an input layer 611 of source neurons 612, one or more computation layer(s) 626 having one or more computation neurons 632, and an output layer 640, where there is a single output neuron 642 for each possible category into which the input example could be classified. An input layer 611 can have a number of source neurons 612 equal to the number of data values 612 in the input data 611. The computation neurons 632 in the computation layer(s) 626 can also be referred to as hidden layers, because they are between the source neurons 612 and output neuron(s) 642 and are not directly observed. Each neuron 632, 642 in a computation layer generates a linear combination of weighted values from the values output from the neurons in a previous layer, and applies a non-linear activation function that is differentiable over the range of the linear combination. The weights applied to the value from each previous neuron can be denoted, for example, by $w_1, w_2, \ldots w_{n-1}, w_n$. The output layer provides the overall response of the network to the inputted data. A deep neural network can be fully connected, where each neuron in a computational layer is connected to all other neurons in the previous layer, or may have other configurations of connections between layers. If links between neurons are missing, the network is referred to as partially connected.

In an embodiment, the computation layers 626 of the VQCU 300 can learn relationships between video chunks, the corresponding QP and the minimum PSNR. The output layer 640 of the VQCU 300 can then provide the overall response of the network as a likelihood score of a prediction of an optimized QP.

Training a deep neural network can involve two phases, a forward phase where the weights of each neuron are fixed and the input propagates through the network, and a backwards phase where an error value is propagated backwards through the network and weight values are updated.

The computation neurons 632 in the one or more computation (hidden) layer(s) 626 perform a nonlinear transformation on the input data 612 that generates a feature space. The classes or categories may be more easily separated in the feature space than in the original data space.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for real-time quality control of video compression for streaming media, comprising:
- partitioning video data from the streaming media into video chunks;
- encoding the video chunks with respective quantization parameters (QP);
- predicting an optimized OP from the video chunks and their respective QP that conforms to a peak signal-to-noise ratio (PSNR) threshold while minimizing an encoded video bitrate of the compressed video by utilizing a trained video quality control unit (VQCU) that determines a minimum PSNR value for the PSNR threshold based on a mean squared error between an image from the video chunks and a noisy approximation of the image, and a maximum possible pixel value of an image from the video chunks; and
- updating the video quality of a streaming media with the optimized QP.

2. The computer-implemented method of claim 1, further comprising providing the streaming media having the updated video quality with the optimized QP to a streaming media device through a network.

3. The computer-implemented method of claim 1, wherein predicting the optimized QP further comprises training the VQCU using tuples of the video chunks, corresponding quantization parameters, and the minimum PSNR threshold.

4. The computer-implemented method of claim 1, wherein predicting the optimized QP further comprises understanding scene complexity and video dynamics by using a video dynamics neural network.

5. The computer-implemented method of claim 4, wherein predicting the optimized QP further comprises generating feature vectors representing scene complexity and video dynamics using convolutional layers of the video dynamics neural network.

6. The computer-implemented method of claim 5, wherein predicting the optimized QP further comprises normalizing the feature vectors using a deep neural network prediction head.

7. The computer-implemented method of claim 6, wherein predicting the optimized QP further comprises generating a tensor representing the minimum PSNR for each video sample as a conditioning factor for a conditional group normalization block of the deep neural network prediction head.

8. A system for real-time quality control of video compression for streaming media, comprising:
- a memory device;
- one or more processor devices operatively coupled with the memory device to:
  - partition video data from the streaming media into video chunks;
  - encode the video chunks with respective quantization parameters (QP);
  - predict an optimized QP from the video chunks and their respective QP that conforms to a peak signal-to-noise ratio (PSNR) threshold while minimizing an encoded video bitrate of the compressed video by utilizing a trained video quality control unit (VQCU) that determines a minimum PSNR value for the PSNR threshold based on a mean squared error between an image from the video chunks and a noisy approximation of the image, and a maximum possible pixel value of an image from the video chunks; and
  - update the video quality of a streaming media with the optimized QP.

9. The system of claim 8, further comprising providing the streaming media having the updated video quality with the optimized QP to a streaming media device through a network.

10. The system of claim 8, wherein to predict the optimized QP further comprises training the VQCU using tuples of the video chunks, corresponding quantization parameters, and the minimum PSNR threshold.

11. The system of claim 8, wherein to predict the optimized QP further comprises understanding scene complexity and video dynamics by using a video dynamics neural network.

12. The system of claim 11, wherein to predict the optimized QP further comprises to generate feature vectors representing scene complexity and video dynamics using convolutional layers of the video dynamics neural network.

13. The system of claim 12, wherein to predict the optimized QP further comprises to normalize the feature vectors using a deep neural network prediction head.

14. The system of claim 13, wherein to predict the optimized QP further comprises to generate tensors representing the minimum PSNR for each video sample as a conditioning factor for a conditional group normalization block of the deep neural network prediction head.

15. A non-transitory computer program product comprising a computer-readable storage medium including program code for deep learning-based quality control for video compression, wherein the program code when executed on a computer causes the computer to:

partition video data from streaming media into video chunks;

encode the video chunks with respective quantization parameters (QP);

predict an optimized QP from the video chunks and their respective QP that conforms to a peak signal-to-noise ratio (PSNR) threshold while minimizing an encoded video bitrate of the compressed video by utilizing a trained video quality control unit (VQCU) that determines a minimum PSNR value for the PSNR threshold based on a mean squared error between an image from the video chunks and a noisy approximation of the image, and a maximum possible pixel value of an image from the video chunks; and update the video quality of a streaming media with the optimized QP.

16. The non-transitory computer program product of claim 15, further comprising providing the streaming media having the updated video quality with the optimized QP to a streaming media device through a network.

17. The non-transitory computer program product of claim 15, wherein to predict the optimized QP further comprises training the VQCU using tuples of the video chunks, corresponding quantization parameters, and the minimum PSNR threshold.

18. The non-transitory computer program product of claim 15, wherein to predict the optimized QP further comprises understanding scene complexity and video dynamics by using a video dynamics neural network.

19. The non-transitory computer program product of claim 18, wherein to predict the optimized QP further comprises to generate feature vectors representing scene complexity and video dynamics using convolutional layers of the video dynamics neural network.

20. The non-transitory computer program product of claim 19, wherein to predict the optimized QP further comprises to normalize the feature vectors using a deep neural network prediction head having a conditional group normalization block that utilizes tensors representing the minimum PSNR for each video sample as a conditioning factor.

* * * * *